United States Patent [19]

McGuire et al.

[11] 4,133,977

[45] Jan. 9, 1979

[54] VOICE SCRAMBLER USING SYLLABIC MASKING

[75] Inventors: Hubert E. McGuire, Plantation, Fla.; William H. Draeger, Corona, Calif.

[73] Assignee: Lear Siegler, Inc., Santa Monica, Calif.

[21] Appl. No.: 772,087

[22] Filed: Feb. 25, 1977

Related U.S. Application Data

[63] Continuation of Ser. No. 597,075, Jul. 18, 1975, which is a continuation-in-part of Ser. No. 467,223, May 6, 1974, abandoned.

[51] Int. Cl.[2] .............................................. H04L 1/02

[52] U.S. Cl. ............................ 179/1.5 M; 179/1.5 R; 179/1.5 S

[58] Field of Search ............... 179/1.5 R, 1.5 S, 1.5 M

[56] References Cited

U.S. PATENT DOCUMENTS

| | | | |
|---|---|---|---|
| 2,204,050 | 6/1940 | Purington | 179/1.5 M |
| 2,393,224 | 1/1946 | Van Dissel | 179/1.5 M |
| 2,400,950 | 5/1946 | Purington | 179/1.5 M |
| 2,905,747 | 9/1959 | Kidd et al. | 179/1.5 M |
| 2,953,643 | 9/1960 | Koenig, Jr. | 179/1.5 R |
| 3,155,908 | 11/1964 | Berman | 179/1.5 R |
| 3,681,708 | 4/1969 | Olmstead | 325/32 |
| 3,696,207 | 10/1972 | Lundin et al. | 179/1.5 R |
| 3,824,468 | 7/1974 | Zegers et al. | 179/1.5 R |
| 3,897,591 | 7/1975 | Lundstrom | 179/1.5 M |

*Primary Examiner*—Howard A. Birmiel
*Attorney, Agent, or Firm*—Christie, Parker & Hale

[57] ABSTRACT

Voice signals are combined with a masking signal that changes frequencies between discrete frequencies at a selected rate and in a random manner. The combined voice spectrum and masking signal is frequency translated by heterodyning the combined signals and a carrier signal, with the carrier signal varying between discrete frequencies at a selected rate that is faster than the selected rate of the masking signal. The scrambled output is coupled to a utilization means through a communication link such as telephone lines or radio frequency waves. The utilization means includes an unscrambler in which the scrambled input is heterodyned with a carrier signal that is synchronized with the carrier signal in the scrambler and has the same discrete frequencies and at the same time as the carrier signal in the scrambler. The combined voice spectrum and masking signal is thus unscrambled and is applied in series to a mixer, a notch filter and another mixer for removing the mask signal. The local oscillator signal for each mixer is the mask signal translated to a higher frequency and synchronized with the mask signal in the scrambler unit.

16 Claims, 2 Drawing Figures

VOICE SCRAMBLER USING SYLLABIC MASKING

CROSS REFERENCE TO RELATED APPLICATIONS

This is a continuation of application Ser. No. 597,075 filed July 18, 1975, which in turn was a continuation-in-part of application Ser. No. 467,223 filed May 6, 1974,now abandoned.

BACKGROUND OF THE INVENTION

1. Field of the Invention:

This invention relates to improvements in communication secrecy systems and is particularly useful where the communication is over public communication channels.

Secrecy systems have been used for many years in military communications. Generally these systems are relatively complex and expensive. In recent times it has become desirable to have secrecy systems for law enforcement agencies and fire departments, as well as other similar agencies employing public communication channels.

2. Description of the Prior Art

Secrecy systems that have been produced in the past have employed such techniques as rolling code and static band splitters to distort the voice signals to provide secrecy. Another technique that has been employed is the rearranging of the voice spectrum on a time basis. A common problem with these earlier attempts to provide secrecy in voice communications is that the code is relatively easy to break for recovery of the message. For example, in the band splitting technique it has been found that if one band is recovered, sufficient intelligence is contained therein for recovery of the message. In these earlier systems the system can generally be broken without looking back at the circuitry used in scrambling the signal. Another approach that has been employed is the scrambling of the voice signals by mixing with a carrier frequency and the subsequent masking of the scrambled signal by application of a masking signal. However, in this system the masking signal may be removed by a simple filter in the decoding circuitry and the code broken thereafter.

SUMMARY OF THE INVENTION

The ease of attacking earlier secrecy systems is overcome by the present invention by employing the method of combining a masking signal with the voice signals before scrambling. By combining the voice signals with a masking signal having a plurality of discrete frequencies between which it varies at a selected rate and on a random basis the syllabic content of the voice signals is masked. The combined signal is then scrambled by frequency translation in a mixer with a local oscillator signal or a carrier signal that has several discrete frequencies between which it varies in a random manner and at a selected rate that is higher than the rate of frequency variation of the masking signal. By the frequency translation the combined voice spectrum and masking signal is spread over a wider band and is scrambled. The scrambled output may be communicated over telephone lines or radio frequency waves or some other communication link to a receiver where it is unscrambled.

In addition to the scrambled output, synchronizing signals are transmitted from the scrambler to the unscrambling unit preceding the scrambled output. The synchronizing signals synchronize the timing and frequencies of signals in the scrambler unit and the unscrambler unit and cause the control unit in the unscrambling unit to start at the same point and in synchronism with the control unit in the scrambler. The scrambled output consisting of the spread combined voice spectrum and masking signals is decoded by first unscrambling the combined signal by frequency translation in the unscrambling unit. A carrier signal having the same discrete frequencies and operating in synchronism with the carrier signal in the scrambler unit is mixed with the scrambled input to remove the carrier signal component. The combined mask and voice signals, now unscrambled, are mixed with a masking signal having discrete frequencies that are above the discrete frequencies of the masking signal in the scrambler unit by a constant frequency. The higher frequency masking signal in the unscrambler changes frequency in synchronism with the masking signal in the scrambler. The higher frequency masking signal is mixed with the combined mask and voice signals in two mixers separated by a notch filter that is tuned to the constant frequency. The output of the second mixer is the clear voice signals.

The method of scrambling and unscrambling is effectively and efficiently accomplished by a scrambler unit having two frequency synthesizers operating in response to a key generator which generates at least two, 4-bit binary control signals which have discrete values that vary in a random manner. In one particularly advantageous key generator a 24-bit shift register is coupled to a parity generator with the two coupled to cycle at a fixed rate determined by a clock input. The lower frequency, frequency synthesizer produces the carrier signal, while the higher frequency, frequency synthesizer produces the masking signal. A mixer is coupled to the output of the second frequency synthesizer and has a constant frequency local oscillator input for translating the masking signal down to place the masking signal spectrum within or equal to the frequency spectrum of the voice signals. A low pass filter connected between the mixer and a linear summer combines the voices spectrum and the masking signal to mask the syllabic content of the voice signals. A mixer is coupled to the output of the summer and mixes the combined signal and the carrier signal. A transmit command circuit is provided in the scrambler to produce a signal that zeros the timing circuit of the scrambler and to transmit a synchronizing signal to the unscrambler for zeroing the timing circuit in the unscrambler.

The unscrambler includes a key generator and two frequency synthesizers controlled by a key generator similar to the frequency synthesizers in the scrambler. One frequency synthesizer produces a carrier signal for unscrambling the signal while the other frequency synthesizer produces a masking signal having a frequency spectrum above the voice spectrum by a constant frequency for removing the masking signal to produce a clear voice signal output.

BRIEF DESCRIPTION OF THE DRAWINGS

The above and other features and advantages of this invention may be understood more clearly and fully upon considerations of the following specification and drawing in which.

DESCRIPTION OF THE PREFERRED EMBODIMENT

Figure 1:
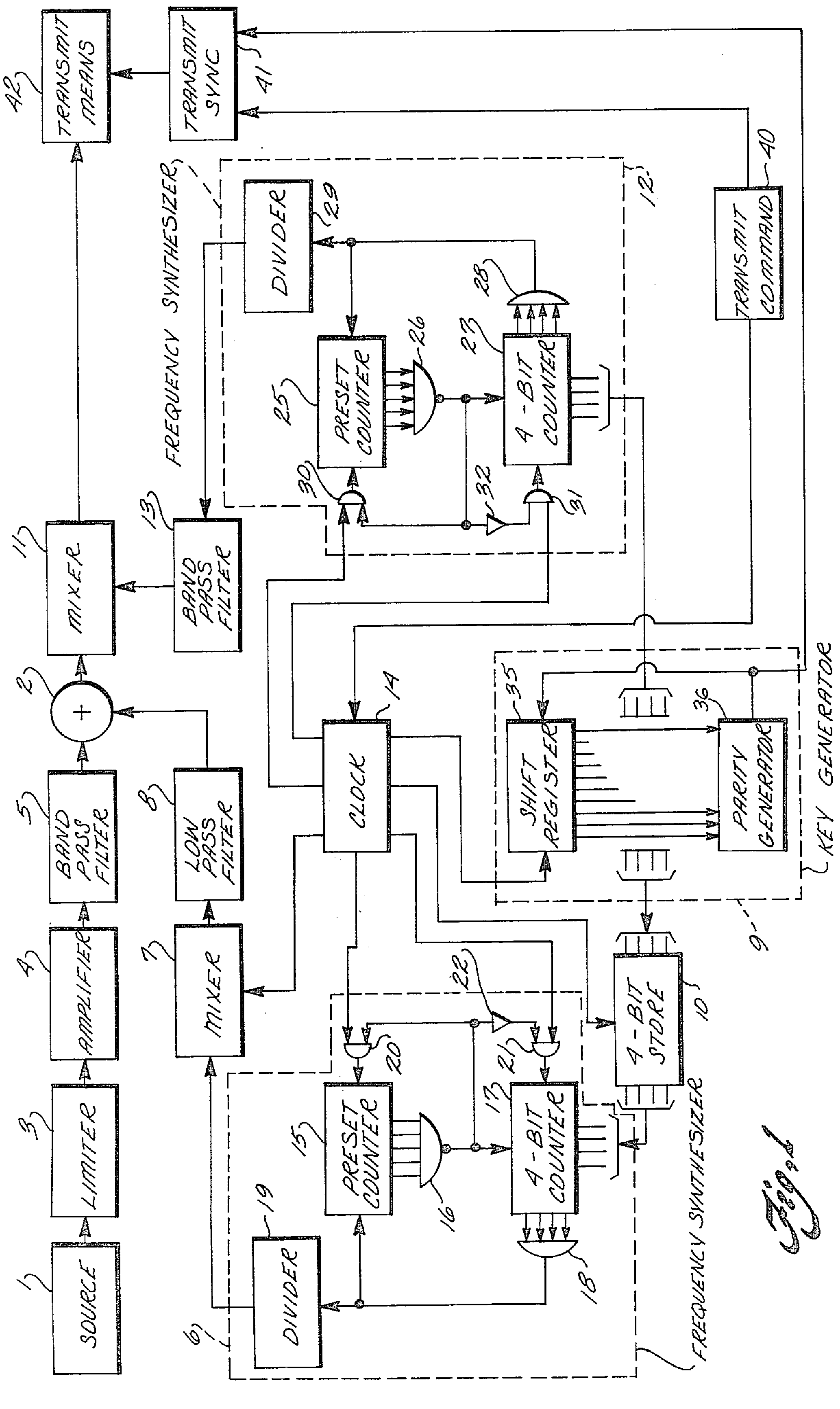
FIG. 1 is a block diagram of a scrambler unit coupled to a transmitting means in accordance with this invention.
Figure 2:
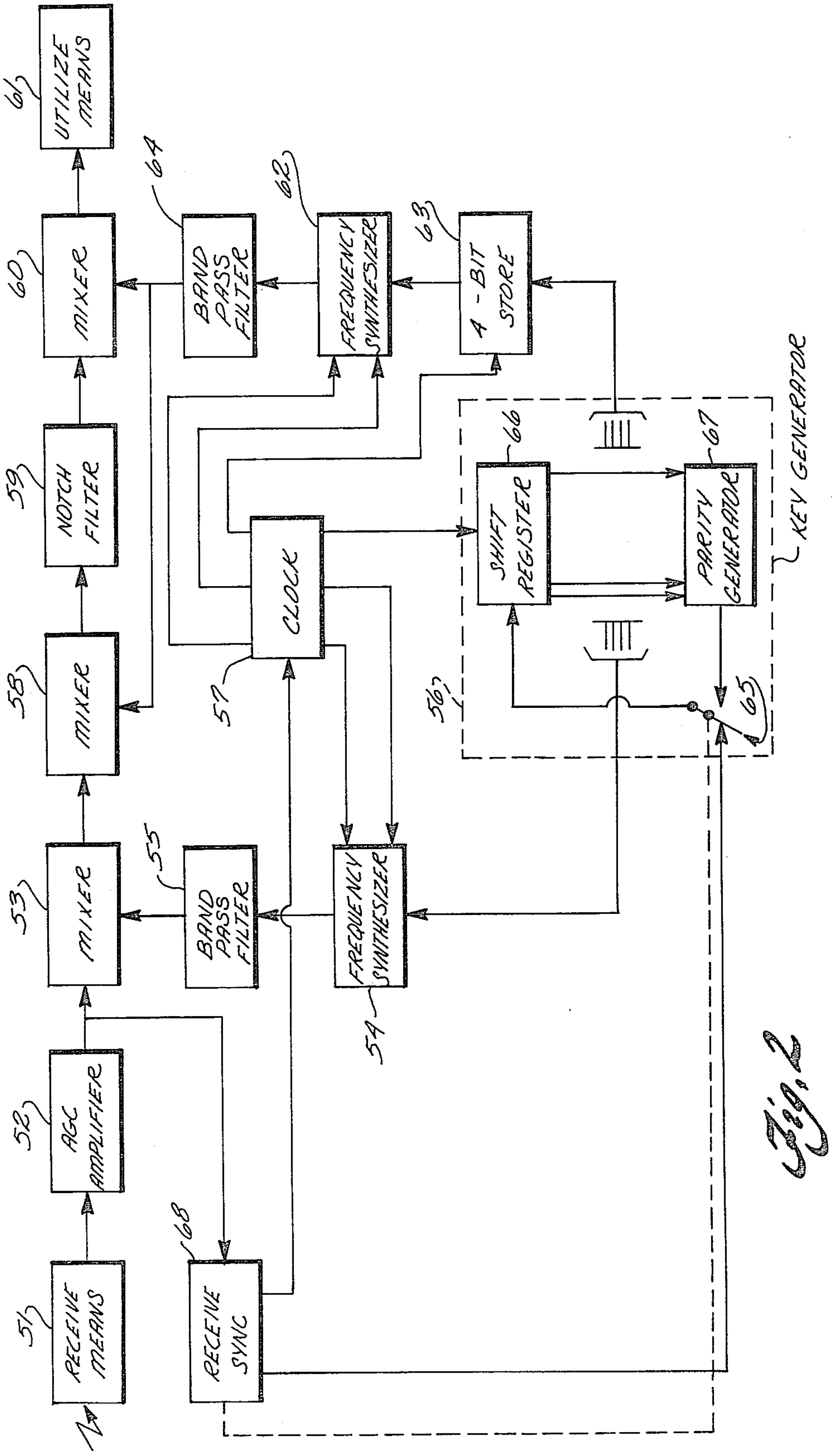
FIG. 2 is a block diagram of an unscrambler coupled through a communication link and a receiver to the scrambler of FIG. 1 in accordance with this invention.

The secrecy system in accordance with this invention includes a scrambler and transmitting unit shown in the block diagram of FIG. 1 and a receiving and unscrambling unit shown in the block diagram of FIG. 2. The scrambler and unscrambler have many common elements and a single unit may be constructed to operate as either a scrambler or an unscrambler. For a single unit to be able to function as both, the unit would include in addition to the common elements, elements that are unique to scrambling and the elements that are unique to unscrambling and means for switching these elements into the circuit depending upon the operation to be performed.

The scrambling of intelligence, and in particular, voice signals to provide secrecy in communication in accordance with this invention comprises the steps of combining the voice signals with a masking signal which effectively masks the syllabic content of the voice signals. The masking signal occurs at a number of discrete frequencies in a random manner with the variation between frequencies occurring at a relatively high rate compared to the rates employed in earlier secrecy systems. The voice signals and masking signal are combined in a linear summer and the combined signal is spread over a relatively wide frequency band by frequency translation in a mixer element. The local oscillator signal, which may be called a carrier signal, occurs at a number of discrete frequencies in a random manner with the variation in frequencies occurring at a higher rate than the variation in the frequencies of the masking signal. The combined voice signals and masking signal are inverted and the frequency spectrum translated in the mixer. The output of the mixer is the scrambled output of the scrambler. A particularly advantageous circuit for performing this method of scrambling is shown in FIG. 1.

A source 1 of intelligence, e.g., voice signals, to be scrambled, is coupled to a linear summer 2 through a limiter 3, amplifier 4, and band-pass filter 5. The second input to the summer 2 is the masking signal provided by a frequency synthesizer 6. The output of the synthesizer 6 is frequency translated in a mixer 7 and passed through a low pass filter 8 which limits the bandwidth of the masking signal to the bandwidth of the voice signals at the first input to the summer 2. The operation of the frequency synthesizer 6 is controlled by a key generator 9 which provides a 4-bit signal to the synthesizer 6 through a 4-bit store 10. The combined voice signals and masking signal at the output of summer 2 are coupled to a mixer 11 where the combined signal is frequency translated and spread over a broader bandwidth. The combined signal is scrambled in this operation and the scrambled output appears at the output of mixer 11. The local oscillator signal for the mixer 11 is provided by a second frequency synthesizer 12 operating at a higher switching rate than the frequency synthesizer 6 under the control of the key generator 9. The output of synthesizer 12 is coupled to the mixer 11 through a band-pass filter 13. The overall timing for the scrambler of FIG. 1 is controlled by a clock 14. The key generator 9, synthesizer 6 and synthesizer 12 are digitally controlled by the clock 14. The frequency synthesizer 6 comprises a preset counter 15 coupled through an inverter AND gate 16 to a 4-bit counter 17. The state of the 4-bit counter 17 is determined by a 4-bit input from the key generator 9 through the 4-bit store 10. The output of the 4-bit counter 17 is coupled through an AND gate 18 to a divider 19 for application to the summer 2 through the mixer 7 and low pass filter 8. The output of the AND gate 18 is also coupled as an input to the preset counter 15. The operation of the preset counter 15 is timed by a clocking signal input from AND gate 20, which has two inputs, one from clock 14 and the other from the output of AND gate 16. The timing of the operation of the 4-bit counter 17 is controlled by a clock signal from AND gate 21, which has an input from clock 14 and a second input from the output of AND gate 16 through an inverter 22. The frequency synthesizer is thus implemented to generate a constant time interval, as programmed by the preset counter 15, plus a variable time interval, which is selected by the data and clock frequency that is entered into counter 17, for each half cycle of the output. Divider 19 then produces a fifty percent duty cycle square wave by alternately being clocked high and low by the reset signal to counter 15. Frequency synthesizer 12 is similarly constructed and includes a preset counter 25 coupled through an AND GATE 26 to a 4-bit counter 27. The 4-bit counter 27 has a 4-bit input from the key generator 9. The output of the 4-bit counter 27 is coupled through an AND gate 28 to a divider 29. The output of AND gate 28 is also coupled to an input of the preset counter 25. The timing signal for the preset counter 25 is coupled through an AND gate 30 while the timing signal for the 4-bit counter 27 is coupled through an AND gate 31. One input of the AND gate 31 is the output of AND gate 26 coupled through an inverter 32. A typical key generator useful in controlling the operation of the scrambler is key generator 9 comprising a shift register 35 and a parity generator 36. The output of the shift register 35 is coupled to the parity generator 36 through a plurality of lines, the number of which is determined by the length of the shift register. Four of these lines provide a 4-bit output for control of frequency synthesizer 6 while another four of the lines provide a 4-bit output for the control of frequency synthesizer 12. The output of parity bit generator 36 is coupled to an input of shift register 35, which also has a timing pulse provided by clock 14.

For unscrambling the scrambled output of the scrambler of FIG. 1 the unscrambler unit must be synchronized with the scrambler unit. For this purpose a transmit command element 40 is coupled to the clock 14 for zeroing the phase of the clock at the beginning of each scrambling operation of the scrambler. The transmit command element 40 is also coupled to a transmit sync unit 41 which couples the transmit command pulse to the unscrambler unit through a transmit means 42.

In addition to the transmit command pulse that is coupled to the transmit sync element 41, the state of the key generator 9 at the time of the transmit command pulse is also coupled through the transmit sync element 41 to the unscrambler unit through the transmit means 42.

The scrambled output is unscrambled in accordance with this invention by frequency translating the scrambled signal. To unscramble the signal, the frequency translation is accomplished in a mixer by applying a local oscillator signal having the same discrete frequencies in synchronism with the carrier signal employed in scrambling. The unscrambled output of the mixer is the combined voice signals and masking signal. The masking signal cannot be removed by a simple filter. The signal is instead removed by double frequency translation and filtering. The combined voice signals and masking signal are frequency translated by heterodyning with a higher frequency masking signal having random discrete frequencies at a constant frequency above the discrete frequencies of the masking signal of the scrambler and changing in synchronism with the frequency of the scrambler masking signal. The constant frequency component is then removed and the intelligence component is thereafter retranslated in frequency by the higher frequency masking signal to provide a clear voice output.

The method of unscrambling may be advantageously accomplished in accordance with this invention by the unscrambler unit shown in the block diagram of FIG. 2. The scrambled signal is received from the transmitting unit by a receive means 51, which may, for example, be a radio receiver. The output of the receive means 51 is coupled through an automatic gain control amplifier 52 to the unscrambler unit. The unscrambler unit comprises a mixer 53 coupled to the output of amplifier 52 and having a local oscillator signal provided by a frequency synthesizer 54 coupled through a band-pass filter 55. The frequency synthesizer 54 is controlled by a key generator 56 which operates in response to a clock 57. The output of the mixer 53 is an unscrambled combined voice signals and masking signal that is coupled to a mixer 58 where it is rescrambled by a signal that has a frequency above the masking signal of the scrambler unit by a constant frequency. The output of mixer 58 is coupled through a notch filter 59 for removal of the constant frequency component. The output of the notch filter 59 is coupled to a mixer 60 which has the same local oscillator input signal as mixer 58. The output of mixer 60 is the clear voice signals which are coupled to a utilization means 61. The local oscillator signal for mixers 58 and 60 is provided by a frequency synthesizer 62 which is controlled by key generator 56 through a 4-bit store 63. The output of the frequency synthesizer 62 is coupled to the mixers 58 and 60 through a band-pass filter 64. The frequency synthesizers 62 and 54 may have the identical construction as frequency synthesizers 6 and 12 respectively of the scrambler shown in FIG. 1. The key generator 56 is similar to the key generator 9 of the scrambler shown in FIG. 1 with the addition of a 2-pole, single-throw switch 65 which is employed in synchronizing the key generator 56 to the state of the key generator 9 in the scrambler. The key generator 56 further includes a shift register 66 and a parity generator 67 connected in the same manner that the identical elements are connected in the key generator 9 of the scrambler. The unscrambler unit of FIG. 2 also includes a receive sync element 68 for decoding the synchronization signals and for starting the clock 57 at zero phase in synchronism with the clock 14 of the scrambler and for starting the key generator 56 in the same state as the key generator 9 in the scrambler.

In operation, the intelligence to be scrambled is clipped by limiter 3 and amplified by amplifier 4. For purposes of illustration voice signals shall be used as the intelligence to be scrambled and the source may therefore be some sort of transducer such as a microphone. The frequency spectrum of the voice signals is controlled by band-pass filter 5. In a typical example, the filter 5 passes a 720 hertz to a 1875 hertz spectrum, which is combined with the masking signal in summer 2. The masking signal is provided by frequency synthesizer 6 under the control of key generator 9.

In one typical non-limiting example the shift register 35 of key generator 9 is a 24-bit register with the output being applied to the parity generator 36. The shift register operates in response to a relatively high frequency clock signal, such as 52 hertz, provided by clock 14. A 4-bit output is coupled from the key generator 9 to the frequency synthesizer 6 through the 4-bit store 10. The 4-bit store is clocked at a low frequency such as 5.2 hertz, for the transfer of the 4-bit signal to the frequency synthesizer 6 at a rate below the rate at which the 4-bit signal is transferred from the key generator 9 to the synthesizer 12. The 4-bit signal from the key generator 9 determines the time of the pulse output of the 4-bit counter 17 that is applied to the divider 19. Divider 19 is a divide by two divider and converts the output pulse to a square wave. The output of the divider 19 is a single frequency pulse, which in this typical example lies between 3.846 kilohertz to 5kilohertz. The frequency of the output pulse from divider 19 has a discrete value which is one of 16 discrete values provided by the frequency synthesizer 6 with the variation between frequencies occurring in a random manner under the control of the key generator 9 and 4-bit store 10. The output signal from synthesizer 6 has a constant frequency base plus a variable frequency determined by the 4-bit signal from key generator 9. The output of divider 19 is applied to mixer 7 where it is frequency translated for the removal of a constant frequency component by the application of a local oscillator signal having a frequency equal to the constant frequency of 3.125 kilohertz in this typical example. The output of the mixer 7 is passed through a low pass filter 8 to prevent out of band signals being applied to the summer 2. The masking at the output of the filter 8 advantageously lies within the frequency spectrum of the voice signals. This masking signal varies over 16 different discrete frequencies and masks the syllabic content of the voice signals.

The combined or composite mask signal and voice signals is applied to mixer 11 which spreads the combined signal over a broader frequency range. A local oscillator signal that has a frequency that varies between 16 discrete frequencies is provided by frequency synthesizer 12 to the mixer 11. This local oscillator signal or carrier signal is band limited by band-pass filter 13. In this typical example the carrier signal has a frequency between 2.336 kilohertz to 3.205 kilohertz. The frequency of the carrier signal changes between the 16 discrete frequencies at a 52 hertz rate in this typical example under the control of the key generator 9. The output of mixer 11 is similar to the output of a single sideband suppressed carrier amplitude modulator and the combined signal is frequency translated and inverted in the mixer 11. In this typical example the scrambled output has two components, one at a frequency equal to the carrier frequency minus the mask signal frequency and the second equal to the carrier frequency minus the voice signal frequencies which thus has a frequency spectrum of 461 hertz to 2.484 kilohertz.

In the apparatus for scrambling intelligence shown in FIG. 1 there is a 16 $\times$ 16 matrix of frequencies at the output where the masked signal will occur. As a consequence unauthorized unscrambling is much more difficult than in earlier secrecy system due to the fact that there is no direct correlation between the scrambled mask and the carrier used to scramble the audio.

The scrambled output in accordance with this invention is coupled to a utilization means through some communication link by a transmit means 42. To unscramble the scrambled output it is necessary to synchronize the circuitry of the unscrambler and for this purpose a synchronize signal precedes the scrambled output. In this way the entire available bandwidth may be used for the scrambled output during the transmission of the scrambled signal. The sync signal is provided by the transmit command element 40 through the transmit sync element 41. At the time of transmission through the transmit sync element 41 a sync signal is also applied to the clock 14 to set the clock at zero phase. The transmit sync signal that is transmitted to the unscrambling unit sets the clock 57 therein with clock 14. The sync signal also permits the state of the key generator 9 at the time of the sync signal to be coupled through the transmit sync unit 41 to the unscrambler for initializing the key generator 56 in the unscrambler.

With reference to the unscrambler shown in FIG. 2, the scrambled input is received by receive means 51 and the amplitude of the scrambled input is controlled by an automatic gain control amplifier 52. The synchronization signal preceding the scrambled input is applied to receive sync circuit 68 which applies the sync signal to clock 57 and the data bits representing the state of key generator 9 to the key generator 56. Upon the sensing of the sync signal by the sync circuit 68, a control signal is applied to switch 65, which may be an electronic switch, for closing the switch between the shift register 66 and the receive sync circuit 68. The state of the key generator 9 is Thus stored in the shift register 66 to initialize the key generator 56. At the completion of the transmission and reception of the synchronization signals the switch 65 is switched to complete the circuit between the parity generator 67 and shift register 66.

A carrier signal having the discrete frequencies indentical to and in synchronism with the carrier signal in the scrambler is provided by frequency synthesizer 54 and applied to mixer 53 through band-pass filter 55. The scrambled input is applied to the mixer 53 and is frequency translated so that an unscrambled signal appears at the output which is the combined or composite mask signal and voice signals. In this typical example this signal has a frequency spectrum between 721 hertz and 1875 hertz. The combined signal is applied to mixer 58 which has a local oscillator signal at a frequency in this typical example between 3.856 kilohertz and 5 kilohertz. This signal has a frequency that is comprised of a constant frequency plus a variable frequency with the constant frequency in this typical example being 3.125 kilohertz. The combined signal at the input of mixer 58 is rescrambled in the mixer and has an output frequency of (f mask + f constant) − (f mask + f voice), which may be expanded to (f mask + f constant − f mask )+
(f mask + f constant − f voice), with f mask dropping out of the component so that the output frequency may be written as:

f constant + (f mask + f const − f voice) This output is applied to a notch filter 59 which removes the constant frequency component. The output signal from notch filter 59 is applied to mixer 60, which has the same local oscillator signal as mixer 58. The masking signal is removed in mixer 60 and a clear voice signal or intelligence appears in the output of this mixer. The recovered intelligence is coupled to a utilization means 61, which may be, for example, a loudspeaker for the conversion of voice signals to audible sound.

Various modifications or changes may be made to the circuitry disclosed herein without departing from the spirit and scope of this invention which is defined by the appended claims.

We claim:

1. A method of communicating in secrecy comprising the steps of adding to the intelligence signals to be communicated a masking signal having a frequency that randomly varies between a plurality of discrete frequencies within the bandwidth of the intelligence, mixing the combined signals with a carrier signal having a frequency that randomly varies between a plurality of discrete frequencies, and removing the mask signal by double frequency translation and filtering.

2. The method of communicating scrambling according to claim 1 comprising the additional steps of passing the voice signals through a band-pass filter to limit the range of frequencies of the voice signals.

3. The method of communicating in accordance with claim 1 wherein the carrier signal has a frequency range above the frequency range of the voice signals.

4. The method of communicating in accordance with claim 1 wherein the carrier signal is modulated by the combined masking signal and voice signal by single sideband suppressed carrier amplitude modulation.

5. The method of communicating in accordance with claim 1 comprising the further step of changing the discrete frequencies of the masking signal at a rate in excess of 10 hertz.

6. The method of communicating in accordance with claim 1 further comprising the step of changing the discrete frequencies of the carrier signal at a rate higher than the rate of changing the discrete frequencies of the masking signal.

7. The method of communicating in accordance with claim 6 wherein the rate of change of the carrier frequencies is at least 10 times the rate of change of the masking frequencies.

8. A voice secrecy system for a voice communication link having a bandwidth of less than 3 kilohertz such as a telephone line comprising means for adding to the intelligence to be scrambled a masking signal that has a frequency that varies between a plurality of discrete frequencies within the bandwidth of the intelligence, means for generating the masking signal, means for frequency translating the combined signal by a carrier signal that has a frequency that varies between a plurality of discrete frequencies, means for generating the carrier signal, and means for extracting the intelligence after scrambling by removing the mask signal by double frequency translation and filtering.

9. A voice secrecy system comprising a scrambler unit, an unscrambler unit and a communication link between the units, the scrambler unit comprising means for adding to the intelligence signals to be scrambled a masking signal that has a frequency that varies between a plurality of discrete frequencies within the bandwidth of the intelligence, means for generating the masking signal, means for frequency translating the combined signal by a carrier signal that has a frequency that varies between a plurality of discrete frequencies, and means for generating the carrier signal, the unscrambler unit comprising first means for frequency translating the output of the scrambler unit to remove the carrier signal, second means for frequency translating the output of the first frequency translating means, a notch filter coupled to the output of the second frequency translating means, and a third means for frequency translating the output of the notch filter.

10. The voice secrecy system in accordance with claim 9 wherein the first frequency translating means of the unscrambler unit comprises a first mixer circuit for removing the carrier signal by mixing the scrambled output of the scrambler unit and a carrier signal having a frequency in synchronism with the carrier signal of the scrambler unit, the second frequency translating means comprising a second mixer circuit coupled to the output of the first mixer and having a local oscillator input at a frequency that tracks the masking signal of the scrambler unit at a constant frequency away from the frequency of the masking signal of the scrambler unit, the third frequency translating means comprising a third mixer coupled to the output of the notch filter and having a local oscillator input the same as the second mixer circuit and wherein the notch filter has a rejection frequency substantially equal to the constant frequency component at the output of the second mixer.

11. A voice scrambler comprising a linear summing circuit having two input terminals, means for generating signals representing voice signals within a selected band of the audio band connected to one input of the summing circuit, means for generating a masking signal having a frequency that randomly varies between discrete frequencies lying within the frequency range of the voice signals, the masking signal generating means being connected to the second input of the summing circuit, means for scrambling the output of the summing circuit by mixing a carrier signal with the masked voice signals, the scrambling means being coupled to the output of the summing circuit and having a carrier signal input, and means for generating the carrier signal having a frequency that randomly varies between a plurality of discrete frequencies, the carrier generating means being connected to one input of the scrambling means; and means for removing the mask signal by double frequency translation and filtering.

12. A voice scrambler in accordance with claim 11 wherein the scrambling means has a single side band output.

13. A voice scrambler in accordance with claim 11 further comprising a system clock for controlling the timing of the masking signal generating means and the timing of the carrier signal generating means.

14. The voice scrambler in accordance with claim 13 further comprising a key generator responsive to the system clock for generating randomly varying signals applied to each signal generating means for varying the frequency of the output signal of each signal generating means.

15. A voice secrecy system having a scrambler unit, an unscrambler unit, and means for coupling the output of the scrambler unit to the unscrambler unit, the scrambler unit comprising a linear summing circuit having two input terminals, means for generating signals representing voice signals within a selected band of the audio band connected to one input of the summing circuit, means for generating a masking signal having a frequency that randomly varies between discrete frequencies lying within the frequency range of the voice signals, the masking signal generating means being connected to the second input of the summing circuit, means for scrambling the output of the summing circuit by mixing a carrier signal with the masked voice signals, the scrambling means being coupled to the output of the summing circuit and having a carrier signal input, means for generating the carrier signal having a frequency that randomly varies between a plurality of discrete frequencies, the carrier generating means being connected to one input of the scrambling means, the scrambling means having a single side band output, a system clock for controlling the timing of the masking signal generating means and the timing of the carrier signal generating means, a key generator responsive to the system clock for generating randomly varying signals applied to each signal generating means for varying the frequency of the output signal of each signal generating means, the masking signal generating means including a frequency synthesizer, the key generator providing a four-bit digital output of the frequency synthesizer, with the frequency synthesizer producing output signals having a fixed constant value and a variable value in response to the output of the key generator, means for translating the output of the frequency synthesizer by a signal from the system clock at a selected constant frequency, a low pass filter connected between the output of the translating means and the input to the summing circuit, circuit means for setting the system clock at the beginning of each scrambling operation and providing an output sync signal to the unscrambler unit, and circuit means for providing a signal at the output of the scrambler unit representing the state of the key generator at the beginning of each scrambling operation, the unscrambler unit comprising a first mixer circuit for removing the carrier signal by mixing the input of the scrambled voice signal and a carrier signal having a frequency in synchronism with the carrier signal of the scrambler unit, a second mixer circuit coupled to the output of the first mixer and having a local oscillator input at a frequency that tracks the masking signal of the scrambler unit at a constant frequency away from the frequency of the masking signal of the scrambler unit, a notch filter coupled to the output of the second mixer for removing the constant frequency component at the output of the second mixer, a third mixer coupled to the output of the notch filter for removing the masking signal, the third mixer having an input of the local oscillator signal, utilization means coupled to the output of the third mixer for utilizing the clear voice signals at the output of the third mixer, means for generating the carrier signal in synchronism with the carrier signal of the scrambler unit, means for generating the local oscillator signal in synchronism with the masking signal of the scrambler unit, a key generator controlling the frequencies of the carrier signal generating means and the local oscillator signal generating means, a system clock for controlling the timing of the signal generating means and the key generator, and means responsive to the sync signal and the state of the key generator signal of the scrambler unit for synchronizing the system clock of the unscrambler unit with the system clock of the scrambler unit and the key generator of the unscrambler unit with the key generator of the scrambler unit.

16. A voice scrambler comprising a linear summing circuit having two input terminals, mean for generating signals representing voice signals within a selected band of the audio band connected to one input of the summing circuit, means for generating a masking signal having a frequency that randomly varies between discrete frequencies lying within the frequency range of the voice signals, the masking signal generating means including a frequency synthesizer, the masking signal generating means being connected to the second input of the summing circuit, means for scrambling the output of the summing circuit by mixing a single side band carrier signal with the masked voice signals, the scrambling means being coupled to the output of the summing circuit and having a carrier signal input, and means for generating the carrier signal having a frequency that randomly varies between a plurality of discrete frequencies, the carrier generating means being connected to one input of the scrambling means, a system clock for controlling the timing of the masking signal generating means and the timing of the carrier signal generating means, a key generator responsive to the system clock for generating randomly varying signals applied to each signal generating means for varying the frequency of the output signal of each signal generating means, with the key generator providing a four-bit digital output to the frequency synthesizer, with the frequency synthesizer producing output signals having a fixed constant value and a variable value in response to the output of the key generator, means for translating the output of the frequency synthesizer by a signal at a selected constant frequency from the system clock, and a low pass filter connected between the output of the translating means and the input to the summing circuit.

* * * * *

UNITED STATES PATENT AND TRADEMARK OFFICE

CERTIFICATE OF CORRECTION

PATENT NO. : 4,133,977

DATED : January 9, 1979

INVENTOR(S) : McGuire et al.

It is certified that error appears in the above-identified patent and that said Letters Patent are hereby corrected as shown below:

Column 2, line 42, "voices" should read -- voice --;
Column 6, line 38, after "ing" insert -- signal --;
Column 7, line 34, "Thus" should read -- thus -- ;
Column 8, line 20, delete "scrambling".

Signed and Sealed this

*First* Day of *May 1979*

[SEAL]

*Attest:*

RUTH C. MASON
*Attesting Officer*

DONALD W. BANNER
*Commissioner of Patents and Trademarks*